(12) United States Patent
Tierney (10) Patent No.: US 6,932,296 B2
(45) Date of Patent: Aug. 23, 2005

(54) CYCLOIDAL VTOL UAV

(75) Inventor: Glenn Martin Tierney, Huntsville, AL (US)

(73) Assignee: Information Systems Laboratories, Inc., San Diego, CA (US)

( * ) Notice: Subject to any disclaimer, the term of this patent is extended or adjusted under 35 U.S.C. 154(b) by 0 days.

(21) Appl. No.: 10/690,284

(22) Filed: Oct. 21, 2003

(65) Prior Publication Data

US 2005/0082422 A1 Apr. 21, 2005

(51) Int. Cl.[7] .............................................. B64C 27/22
(52) U.S. Cl. .............................. 244/9; 244/19; 244/20; 244/12.2; 244/23 C
(58) Field of Search ................. 244/9, 10, 19, 244/20, 21, 12.2, 23 B, 23 C (56) References Cited

U.S. PATENT DOCUMENTS

| | | | |
|---|---|---|---|
| 1,264,152 A | 4/1918 | Briggs | |
| 1,334,707 A | 3/1920 | Martin | |
| 1,795,501 A | * 3/1931 | Platt | 244/20 |
| 1,803,498 A | 5/1931 | Chilton | |
| 2,369,832 A | 2/1945 | Klose | |
| 2,507,657 A | * 5/1950 | Wiessler | 244/9 |
| 3,801,047 A | * 4/1974 | Dell'Aquila | 244/19 |
| 4,194,707 A | * 3/1980 | Sharpe | 244/9 |
| 4,417,708 A | 11/1983 | Negri | |
| 5,100,080 A | * 3/1992 | Servanty | 244/9 |
| 5,265,827 A | * 11/1993 | Gerhardt | 244/20 |
| 5,918,832 A | 7/1999 | Zerweckh | |

* cited by examiner

Primary Examiner—J. Woodrow Eldred
(74) Attorney, Agent, or Firm—Nydegger & Associates (57) ABSTRACT

A system and method for moving an aerial vehicle along a flight path includes rotatable hubs mounted on opposite sides of the vehicle. Elongated airfoils are mounted on the hubs parallel to a common hub axis for rotation about the hub axis on a blade path. Each airfoil defines a chord line and the system includes a gear assembly changeable, during hub rotation, between a first modality wherein airfoil chord lines remain tangential to the blade path (curtate flight), and a second modality wherein airfoil chord lines remain parallel to the flight path of the vehicle (prolate flight). Also, rotation of the hub can be stopped and the airfoils used for fixed wing flight.

15 Claims, 4 Drawing Sheets

CYCLOIDAL VTOL UAV

FIELD OF THE INVENTION

The present invention pertains generally to propulsion and flight control systems for heavier-than-air and lighter-than-air vehicles. In particular, the present invention pertains to propulsion and flight control systems that incorporate airfoils which can be held stationary or rotated in different rotational modes. The present invention is particularly, but not exclusively, useful as a system and method for in-flight transitions of an aircraft's propulsion and control system between a fixed wing flight mode and selected rotating wing flight modes.

BACKGROUND OF THE INVENTION

For atmospheric flight by heavier-than-air vehicles, it is well known that airfoils can be used in various ways to either propel or control the flight of the vehicle. For example, propellers are airfoils; the wings of airplanes are airfoils; and the rotor-blades of helicopters are airfoils. Broadly defined, an "airfoil" is a part or a surface, such as a wing, a propeller blade or rudder, whose shape and orientation control the stability, direction, lift, thrust, or propulsion of an aerial vehicle. For the purposes of the present invention, an airfoil is to be generally considered as an aerodynamically shaped, elongated blade that defines a longitudinal axis which extends from the root of the blade to its tip. The blade also defines a chord line that extends from the leading edge of the blade to its trailing edge, and that is generally perpendicular to the blade axis. As is well known, various configurations of airfoils have been designed and constructed for different kinds of aerial vehicles. The more commonly known vehicles that incorporate airfoils include: airplanes, helicopters, auto-gyros, rockets, and tilt-wing aircraft.

It has long been an objective in the design of manned aerial vehicles, to provide a vertical take-off and landing (VTOL) aircraft that is capable of performing within an extended operational flight envelope. Insofar as speed is concerned, such an aerial vehicle would preferably have a flight envelope that extends from hovering flight (i.e. zero velocity) to high-speed flight (e.g. greater than 250 knots). Further, it would be desirable for such a vehicle to have the capability of effectively, efficiently, and smoothly transitioning from one flight mode (e.g. hover, slow flight and high-speed flight) to another flight mode.

With certain limitations, helicopters and tilt wing aircraft are examples of aerial vehicles that have been designed with many of the above-mentioned objectives in mind. In this development and design process, however, other vehicle configurations have also been developed. As early as the 1930s, there was some experimentation with the so-called cycloidal propellers. Specifically, these propellers each incorporate several blades which move on respective cycloidal-type paths as they rotate about a common axis. Cycloidal propellers have the common characteristic that the respective longitudinal axis of each blade remains substantially parallel to a common axis of rotation as the propeller is rotated. In another aspect, however, cycloidal propellers can be rotated in either of two modes. One mode (curtate) is characterized by a blade movement wherein the chord line of the blade remains substantially tangential to the rotational path of the blade around the common axis. Another mode (prolate) is characterized by a blade movement wherein the chord line of the blade remains substantially parallel to the flight path of the vehicle as the blade is rotated around the common axis. In particular, a discussion of prolate flight is provided by U.S. Pat. No. 2,045,233 which issued in 1934 to Kirsten et al. for an invention entitled "Propeller for Aircraft." In contrast with the cycloidal modes of blade movement, if the blade is stabilized, so as not to rotate around the common axis, a third mode (fixed wing) is established. It happens that each of the above-mentioned flight modes has its advantages.

In light of the above, it is an object of the present invention to provide a system for moving an aerial vehicle which can propel and control the vehicle at hover and slow flight (curtate flight mode), at intermediate flight speeds (prolate flight mode), and in high-speed cruise (fixed wing mode). Another object of the present invention is to provide a system for moving an aerial vehicle that can effectively, efficiently, and smoothly transition between the curtate, prolate and fixed wing modes of flight. Yet another object of the present invention is to provide a system for moving an aerial vehicle which is simple to operate, relatively easy to manufacture, and comparatively cost effective.

SUMMARY OF THE INVENTION

The present invention is directed to a combined, cycloidal transmission and flight control system that operates to control and selectively propel an aerial vehicle along a flight path in either of three different operational flight modes. As described below in detail, these flight modes are: 1) curtate flight (hover and slow flight); 2) prolate flight (intermediate forward speeds); and 3) fixed wing flight (high speed forward flight).

Structurally, the system of the present invention requires a pair of rotatable hubs that are each individually mounted on opposite sides of the vehicle's fuselage. A plurality of equally, spaced-apart blade gears (e.g. three) are mounted near the periphery of each hub for rotation with the hub about a hub axis. Further, an airfoil blade is fixedly attached to each blade gear for movement with the blade gear. Thus, when the hub is rotated for flight in either the curtate or the prolate flight mode, each airfoil blade will travel on a blade path around the hub axis. In these two flight modes, the airfoils provide propulsion, as well as lift and control of the vehicle. On the other hand, when the hub is held stationary on the fuselage (a fixed wing flight mode), the airfoils' only function is to provide lift and control. Propulsion in the fixed wing flight mode is then provided either by a shrouded propeller on the empennage of the vehicle, or by some other propulsion means.

Each airfoil blade in the system of the present invention defines both a blade axis that extends the length of the blade, and a chord line that extends from the leading edge to the trailing edge of the airfoil blade. Operationally, a gear assembly moves each blade gear to individually control the angle of attack for each airfoil blade (i.e. the angle between the chord line of the airfoil and the relative wind). Specifically, this gear assembly is changeable to transition the system between its various flight modes. As indicated above, these modes are: the curtate flight mode (a first modality) wherein the chord line of the blade is maintained generally tangential to the blade path during the rotation of the hub; the prolate flight mode (a second modality) wherein the chord line of the blade is maintained generally parallel to the flight path of the vehicle as the blade rotates on its blade path; and the fixed wing flight mode (a third modality) wherein the chord line of the blade is maintained generally parallel to the flight path of the vehicle while the hub is held stationary on the vehicle.

In accordance with the present invention, control for each airfoil blade is provided by a dedicated gear assembly that collectively includes the blade gear mentioned above, a mid-gear, and a center gear. In their relationship to each other, the mid-gear is positioned between the blade gear and the center gear. Further, in each gear assembly there is a link that interconnects the center of the blade gear to the center of the mid-gear. Also, there is another link that interconnects the center of the mid-gear to the center of the center gear. Within this assembly, the blade gear and the mid-gear can be rotated about their respective axes in all of the three flight modes. For the prolate flight mode, however, although the blade gear and mid-gear can still rotate, rotation of the center gear is constrained.

As implied above, several (e.g. three) gear assemblies will be incorporated into each hub. The respective center gears will then establish a gear cluster in which all of the center gears rotate about a common center gear axis. An indexing of the respective center gears in the cluster, however, will be different in the curtate mode than it is in the prolate mode. Specifically, consider that as each center gear rotates about the center gear axis, it has a predetermined start point on the hub where its azimuthal angle ($\phi$) is zero ($\phi=0°$). Then for a three gear assembly system, as the hub is rotated in the curtate mode there will need to be a 120° off-set between the azimuthal start points for each of the center gears (i.e. $\phi_1=0°$, $\phi_2=120°$, and $\phi_3=240°$). On the other hand, for the prolate mode, all of the center gears will need to be re-indexed with a common azimuthal start point (i.e. $\phi_1=\phi_2=\phi_3=0°$).

In operation, for both the curtate and prolate flight modes, the hubs on the vehicle are rotated around the hub axis by a drive shaft. Because the blade gears are mounted at or near the periphery of the hub, they are also driven along the blade path around the hub axis. When the center gears of the gear assemblies are allowed to rotate on the shaft, around their common center gear axis with off-set start points ($\phi_1=0°$, $\phi_2=120°$, and $\phi_3=240°$), the result of hub rotation is the curtate flight mode. On the other hand, when the center gears are held stationary on the shaft (i.e. the center gears do not rotate about the common center gear axis, with $\phi_1=\phi_2=\phi_3=0°$) the result of hub rotation is the prolate flight mode. Thus, in both the curtate and prolate flight modes, the rotating hub causes the airfoil blades to move with their respective blade gears on the blade path around the hub axis of rotation.

As indicated above, for the curtate flight mode (i.e. when the center gears have off-set start points) the chord line of the airfoil remains substantially tangential to the blade path. For propulsion and control purposes, cyclical variations of the respective angles of attack for each airfoil in the curtate mode are introduced by moving the cluster of center gears. Specifically, this movement is accomplished by moving the cluster of center gears omni-directionally in a plane such that the common center gear axis remains substantially parallel to the hub axis of rotation. A consequence of this is that cyclical changes in the respective angles of attack remain azimuthally uniform as the airfoil blades rotate about the hub axis.

For the prolate flight mode (i.e. when the center gears are constrained), although the airfoil blades still rotate with the blade gear around the hub axis, the chord line of the airfoil remains substantially tangential to the flight path of the vehicle. In this flight mode, the center gears are indexed so that all of the airfoils have a common azimuthal start point ($\phi_1=\phi_2=\phi_3=0°$) for their respective rotations about the hub axis. Again, however, cyclical changes in the respective angles of attack will remain azimuthally uniform as the airfoil blades rotate about the hub axis. Like the curtate flight mode, when the vehicle is in the prolate flight mode, propulsion and control of the vehicle is primarily obtained by cyclical variations in the respective angles of attack for each airfoil. Again, like the curtate mode, these variations are introduced by moving the center gears such that the common center gear axis remains substantially parallel to the hub axis of rotation.

As indicated above, for fixed wing flight, the hubs are stopped. Specifically, the hubs are stopped when hub rotation slows to below about 5 RPM, and they are stopped at a predetermined position. For example, when there are three airfoil blades per hub, the fixed wing configuration will preferably have two forward airfoil blades and one trailing blade. Specifically, one of the forward airfoils is stopped directly under the other, with the trailing airfoil blade generally behind and between the two forward airfoils. To accomplish this, both RPM and hub position can be measured electronically, and a solenoid latch can be activated to stabilize the hub when its correct position has been reached.

Control over the airfoil blades in the fixed wing flight mode can be accomplished in several ways. For one, the angle of attack for all of the airfoil blades can be uniformly changed in unison by rotating the center gear. For another, the angle of attack for only the trailing airfoil blade can be changed. This is done by moving the center gears fore and aft. Further, by moving the center gears with a component that is perpendicular to the fore and aft movement, the airfoil blades can be moved to act as spoilers.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
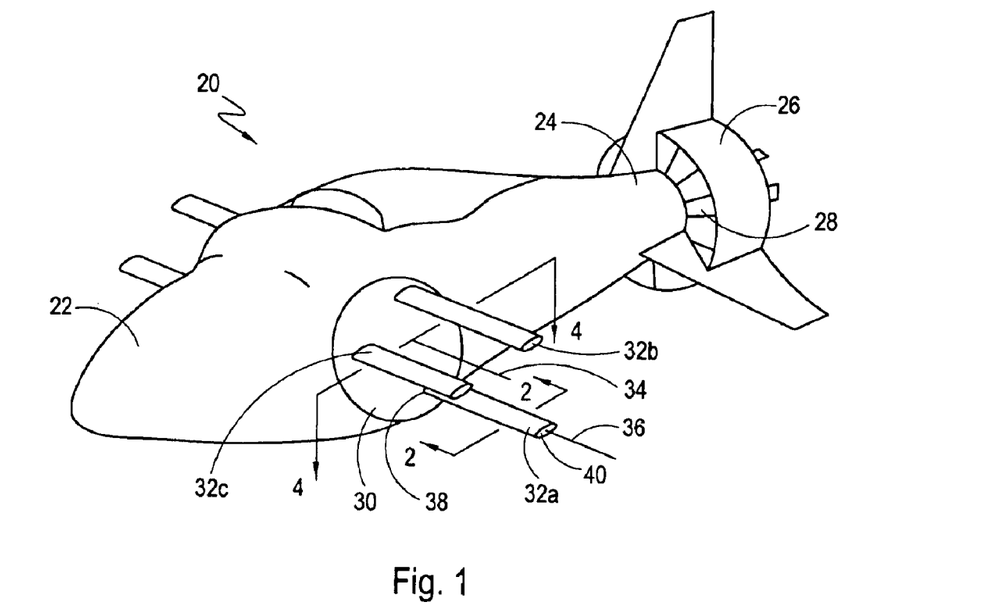
FIG. 1 is a perspective view of an aerial vehicle employing the cycloidal propulsion system of the present invention.

Referring initially to FIG. 1, an aerial vehicle that incorporates a cycloidal propulsion and control system in accordance with the present invention is shown and is generally designated 20. As shown, the vehicle 20 has a fuselage 22 and an empennage 24. A shroud 26 is shown mounted on the empennage 24 and a propeller 28 is surrounded by the shroud 26. From FIG. 1 it will be appreciated there is a hub assembly on each side of the fuselage 22 that includes a hub 30 and a plurality of blades 32. As intended for the present invention, the plurality of blades 32 can be rotated with the hub 30 around the hub axis 34. At this point, it is to be noted that for purposes of this disclosure, the blades 32a, 32b and 32c shown in FIG. 1 are only exemplary because there may be either more or fewer blades 32 used in a hub assembly. Accordingly, discussions herein are often made with reference to only a single blade 32. With this in mind, the referenced blade 32 may, in fact, be any one of the blades 32a, 32b or 32c. In any event, each blade 32 is an airfoil.

Figure 2:
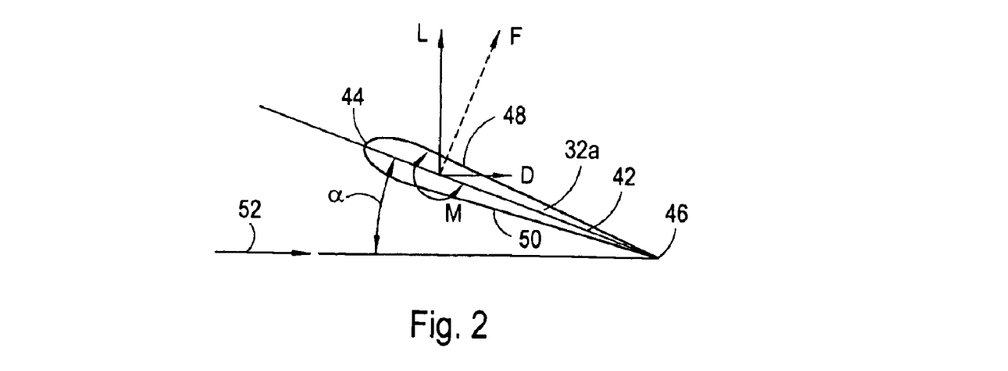
FIG. 2 is a cross-sectional view of an airfoil (blade) of the cycloidal propulsion system of the present invention as seen along the line 2—2 in FIG. 1, with representative aerodynamic forces acting on the airfoil superposed thereon.

As indicated in FIG. 1, each blade 32 (e.g. blade 32a) has a blade axis 36 that extends generally in a direction from the root 38 of the blade 32 to its tip 40. Using this structure as a base for reference, the aerodynamic properties of the blade 32 will be better appreciated with reference to FIG. 2. There it will be seen that each blade 32 defines a chord line 42 that extends from the leading edge 44 of the blade 32 to its trailing edge 46, and that is generally perpendicular to the blade axis 36. Depending on several factors, which include the respective design shapes of the upper surface 48 and the lower surface 50 of blade 32, as well as the angle of attack (α) between the chord line 42 and the relative wind 52, an aerodynamic force (F) will be generated on the blade 32 in accordance with well known aerodynamic principles. Specifically, as shown in FIG. 2, components of the force (F) will include lift (L) and drag (D), as well as a moment (M). For purposes of this disclosure, it is sufficient to appreciate that these forces are generated on the blade 32 in response to a relative wind 52, and that these forces can be controlled by properly orienting the blade 32 with the relative wind 52.

Figure 3A:
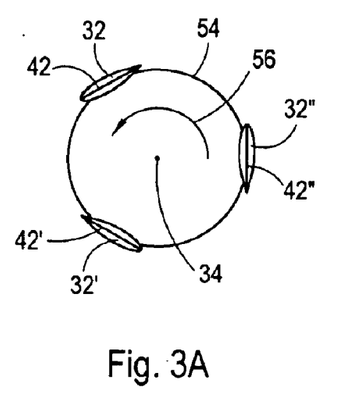
FIG. 3A is a schematic view of the airfoils (blades) of the cycloidal propulsion system in a curtate mode of flight.
Figure 3B:
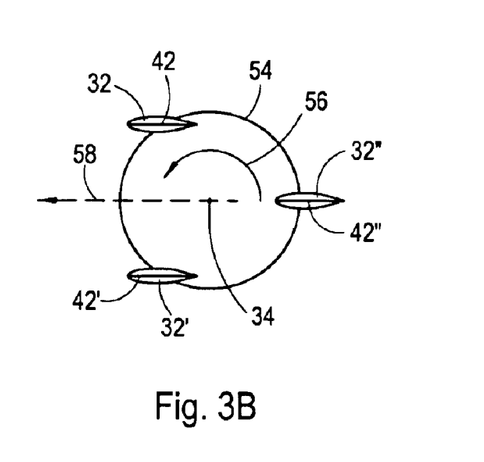
FIG. 3B is a schematic view of the airfoils (blades) of the cycloidal propulsion system in a prolate mode of flight.

As mentioned above, the present invention envisions that blades 32 will be rotated by the hub 30 in either of two modes. These modes are the curtate mode and the prolate mode, and are respectively shown in FIG. 3A (curtate) and FIG. 3B (prolate). Specifically, it will be appreciated that as a blade 32 is rotated by the hub 30, it will travel on a circular blade path 54 around the hub axis 34. When rotated in the direction of arrow 56, the blade 32 will sequentially pass through the locations on blade path 54 indicated by blade 32, 32' and 32". It is important to recognize that for rotation in the curtate mode (FIG. 3A), at each blade location 32, 32' and 32", the orientation of the respective chord lines 42, 42' and 42" will remain substantially tangential to the blade path 54. On the other hand, for the prolate mode (FIG. 3B) the orientation of the respective chord lines 42, 42' and 42" will remain substantially parallel to the direction of flight of the vehicle 20 (indicated by the arrow 58 in FIG. 3B). How this is accomplished for the present invention is best considered with initial reference to FIG. 4.

Figure 4:
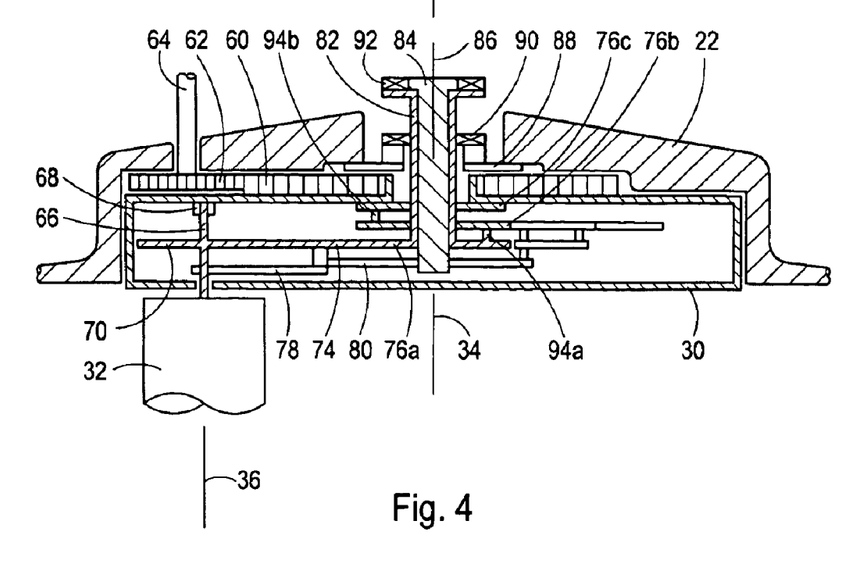
FIG. 4 is a cross-sectional view of a hub assembly for the system of the present invention as seen along the line 4—4 in FIG. 1.

In FIG. 4 it is to be appreciated that a hub gear 60 is fixedly attached to the hub 30. Consequently, the rotation of a drive gear 62 by a drive shaft 64 will cause the hub 30 to rotate relative to the fuselage 22. It will also be appreciated with reference to FIG. 4 that the blade 32 is fixed to a blade shaft 66 and that, in turn, the blade shaft 66 is held on the hub 30 by a pivot mount 68. As intended for the present invention, with this structure the blade 32 is driven along the blade path 54 by a rotation of the hub 30 while, at the same time, the blade 32 is free to independently rotate with the shaft 66 about the blade axis 36. FIG. 4 also shows that a blade gear 70 is attached to the blade shaft 66 for movement therewith.

Figure 5:
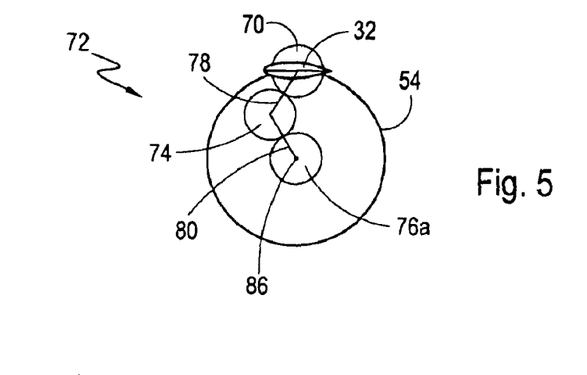
FIG. 5 is a schematic view of a gear assembly with attached airfoil.

By cross referencing FIG. 4 with FIG. 5 it will be seen that the blade gear 70 is a component of a gear assembly that is shown in FIG. 5 and generally designated 72. In detail, the gear assembly 72 includes the blade gear 70 as well as a mid-gear 74 and a center gear 76. Further, the gear assembly 72 includes a link 78 that interconnects the center of rotation of blade gear 70 with the center of rotation of mid-gear 74. Similarly, a link 80 interconnects the center of rotation of mid-gear 74 with the center of rotation of center gear 76. At this point it is to be understood that, for the present invention, each hub 30 preferably includes three separate gear assemblies 72. Accordingly, the respective center gears 76 of the gear assemblies 72 have been variously designated 76a, 76b and 76c.

In FIG. 4, for one embodiment of the present invention, it is shown that the center gear 76a is fixedly attached to a sleeve shaft 82. The link 80, however, which connects the respective centers of rotation of the mid-gear 74 and the center gear 76a is connected to an inner shaft 84. As shown, the inner shaft 84 is coaxial with the sleeve shaft 82 and, accordingly, both the inner shaft 84 and sleeve shaft 82 will rotate about a same center gear axis 86. Importantly, although the center gear axis 86 and the hub axis 34 remain parallel to each other, they are not necessarily collinear (i.e. coaxial). As disclosed in more detail below, relative off-set movements between the center gear axis 86 and the hub axis 34 provide control over the angle of attack (α) of the airfoil blade 32.

Still referring to FIG. 4, an x-y pad 88 is shown which is mounted on the vehicle 20 so as to be moveable relative to the fuselage 22. Further, a brake 90 is mounted on the x-y pad 88 that is used to selectively grip and hold the sleeve shaft 82 stationary relative to the x-y pad 88. Additionally, there is a brake 92 that is mounted on the sleeve shaft 82 to selectively grip and hold the inner shaft 84 stationary relative to the sleeve shaft 82. Thus, when the brake 92 is activated, and brake 90 is deactivated, sleeve shaft 82 will rotate together with the inner shaft 84 about the center gear axis 86. In this configuration the center gear 76a and the other gears 70, 74 in the gear assembly 72 are driven by a rotation of the hub 30 (curtate mode). On the other hand, when the brake 90 is activated and brake 92 is deactivated, the sleeve shaft 82 is held stationary relative to the x-y pad 88. The inner shaft 84, however, is able to rotate inside the sleeve shaft 82. In this configuration the center gear 76a is not driven in rotation by the hub 30. Instead, the mid-gear 74, which is still being driven by hub 30, rotates around the periphery of the center gear 76a (prolate mode). The effect that this has on other center gears 76 in a cluster (e.g. the cluster of center gears 76a, 76b and 76c) will perhaps be best appreciated with reference to FIGS. 6A and 6B.

Figure 6A:
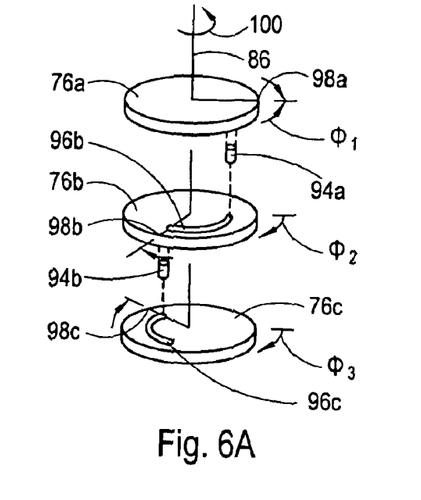
FIG. 6A is an exploded representation of the center gear cluster of a hub assembly showing the interaction of center gears in the curtate flight mode.

Referring initially to FIG. 6A, it is noted that the center gears 76a, 76b and 76c collectively constitute a gear cluster. In FIG. 6A, this cluster is shown with the individual center gears 76 in an exploded relationship relative to each other. From this relationship it can be seen that the center gear 76a is formed with a pin 94a. As indicated, the pin 94a is affixed to the center gear 76a and extends therefrom for insertion into an azimuthal slot 96b that is formed into the center gear 76b. Similarly, the center gear 76b has a pin 94b that extends therefrom for insertion into an azimuthal slot 96c that is formed into center gear 76c. For a cluster of three center gears, the azimuthal slots 96b and 96c on center gears 76b and 76c, respectively, will each extend through an arc of 120° (i.e. $\phi_2=\phi_3=120°$). Thus, when the center gear 76a rotates about the center gear axis 86, as indicated by the arrow 100, a start point 98b on center gear 76b will follow the start point 98a on center gear 76a by the angle $\phi_2=120°$. Similarly, a start point 98c on center gear 76c will follow the start point 98b on center gear 76b by the angle $\phi_3=120°$. For referencing purposes, the indexing of the center gears 76a, 76b and 76c as shown in FIG. 6A pertains to the curtate flight mode.

Figure 6B:
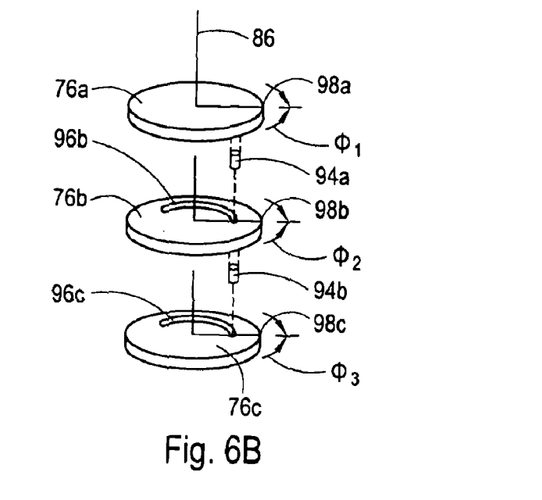
FIG. 6B is an exploded representation of the center gear cluster of a hub assembly showing the interaction of center gears in the prolate flight mode.

Unlike the situation portrayed in FIG. 6A, the gear cluster shown in FIG. 6B is not being rotated. Specifically, this condition occurs when the brake 90 is activated to stop the rotation of center gear 76a relative to the x-y pad 88. The other center gears in the cluster (i.e. center gears 76b and 76c), however, do not stop rotating with the center gear 76a. Instead, when the center gear 76a is stopped, the center gear 76b will continue to rotate through the angle $\phi_2$ (e.g. 120°) until the interaction between pin 94a of center gear 76a and the azimuthal slot 96b in center gear 76b stops the center gear 76b. Center gear 76c, will then still continue to rotate through the angle $\phi_3$ (e.g. another 120°) until the interaction between pin 94b of center gear 76b and the azimuthal slot 96c in center gear 76c stops the center gear 76c. At this point, as seen in FIG. 6B, the respective start points 98a, 98b and 98c of center gears 76a, 76b and 76c are in alignment. For referencing purposes, the indexing of the center gears 76a, 76b and 76c as shown in FIG. 6B pertains to the prolate flight mode.

Figure 7A:
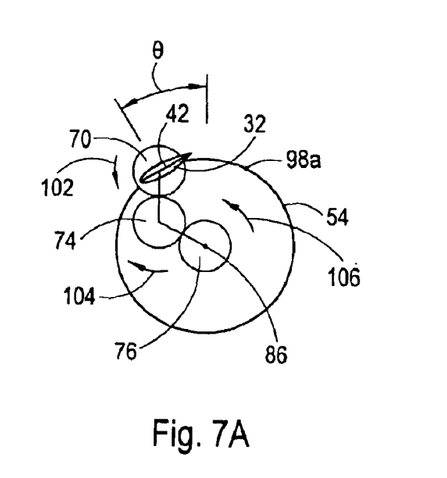
FIG. 7A is a schematic representation of a rotation of a gear assembly through an angle θ in the curtate flight mode.
Figure 7B:
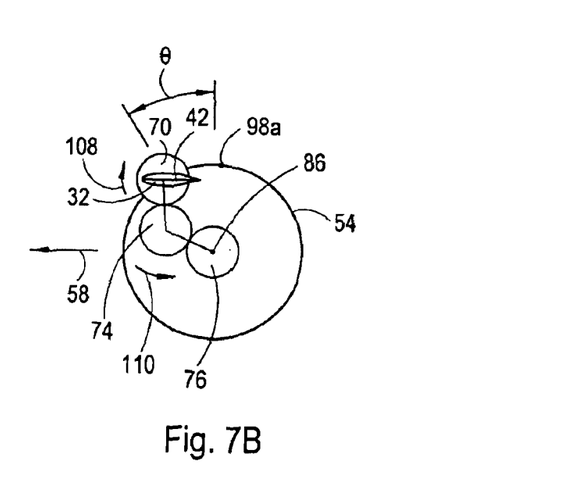
FIG. 7B is a schematic representation of a rotation of a gear assembly through an angle θ in the prolate flight mode.

The consequences of respectively indexing the representative clusters of center gears 76 shown in FIGS. 6A and 6B will, perhaps, be best appreciated by referencing FIG. 6A with FIG. 7A (curtate mode) and FIG. 6B with FIG. 7B (prolate mode). When making these references, consider that the center gear 76 shown in FIGS. 7A and 7B may be either center gear 76a, 76b or 76c. Also, consider that the position of airfoil blade 32, as shown in both FIGS. 7A and 7B, indicates a rotation of the hub 30 through an angle θ, starting from a location wherein the airfoil blade 32 is positioned as shown in FIG. 5. With all of this in mind, first consider the curtate mode of flight (FIG. 7A) wherein the center gear 76 is driven by the hub 30 in rotation around the center gear axis 86.

As seen in FIG. 7A, with a rotation of the hub 30 through an angle θ, the airfoil blade 32 is moved along an arc on the blade path 54 through the same angle θ. This movement causes the blade gear 70 to urge against the mid-gear 74, which, in turn, urges against the center gear 76. As this happens, the centers of the various gears 70, 74 and 76 remain connected by the respective links 78 and 80, and the center gear axis 86 is held substantially stationary relative to the blade path 54. The result is that all of the gears 70, 74 and 76 will rotate. Specifically, the blade gear 70 rotates in the direction of arrow 102, the mid-gear 74 rotates in the direction of arrow 104, and the center gear 76 rotates in the direction of arrow 106. Because all of the gears 70, 74 and 76 have substantially the same diameter, the consequence of this is that the chord line 42 of airfoil blade 32 remains substantially tangential to the blade path 54 (this is the curtate mode). On the other hand, when the center gear 76 is held stationary for the prolate mode, only the blade gear 70 and mid-gear 74 will rotate in response to a rotation of the hub 30. Specifically, as shown in FIG. 7B the blade gear 70 will rotate in the direction of arrow 108, and mid-gear 74 will rotate in the direction of arrow 110. The consequence in this case is that the respective rotations of the gear 70 and 74 off-set or cancel each other. Thus, during movement of the airfoil blade 32 along the blade path 54, the chord line 42 of the blade 32 remains substantially parallel to the flight path of the vehicle 20, indicated by the arrow 58.

An important fact for consideration in the blade motions discussed above is the location of the start points 98 for the various center gears 76 as the airfoil blades 32 travel around the hub axis 34 on blade path 54. In the curtate mode (FIG. 6A and FIG. 7A) the start points 98b and 98c of center gears 76b and 76c, respectively, follow the start point 98a of center gear 76a by 120° and 240°. Within this relationship, the chord lines 42 of the respective blades 32a–c remain substantially tangential to the blade path 54 at all locations on the blade path 54. In the prolate mode, however (FIG. 6B and FIG. 7B), the center gears 76a–c are re-indexed so that all of the gears 76 are effectively aligned to have a common start point 98. Within this relationship, the chord lines 42 of the respective blades 32a–c have a same orientation at each same point on the blade path 54. Specifically, as intended for the present invention, this same orientation at each same point maintains the chord line 42 of the respective airfoil blades 32 substantially parallel to the flight path of the vehicle 20.

Figure 8:
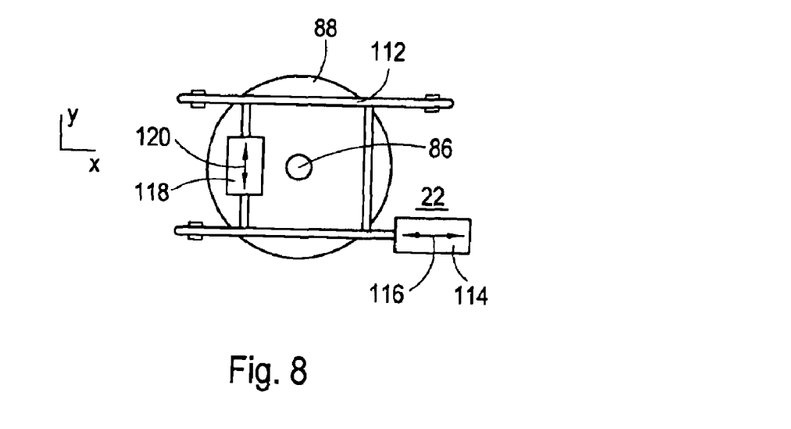
FIG. 8 is a schematic representation of a servo control system for controlling the cycloidal propulsion system of the present invention.

Control over the respective angles of attack (α) for the airfoil blades 32 in the curtate and prolate flight modes is accomplished by collectively moving the cluster of center gears 76 in translation. Specifically, this translation is accomplished by moving the center gear axis 86 in a radial direction from the hub axis 34, while the center gear axis 86 remains substantially parallel to the hub axis 34. In particular, the translational movement of the cluster of center gears 76 is accomplished by moving the x-y pad 88. In FIG. 8 it will be seen that to do this, a frame 112 is mounted on the fuselage 22 and a servo 114, which is also mounted on the fuselage 22, is connected between the fuselage 22 and the frame 112 to move the frame 112 in a back-and-forth motion in the x-direction (indicated by the arrows 116). Another, independently operated servo 118 is mounted directly on the x-y pad 88 and it is connected with the frame 112 to move the frame 112 in a back-and-forth motion on the x-y pad 88 in the y-direction (indicated by the arrows 120). As intended for the present invention, movement of the x-y pad 88 in its x-y plane on the fuselage 22 can be accomplished omni-directionally through distances from the hub axis 34 that may be as much as one half of the diameter of the center gears 76. The omni-directional capability of this movement can then be employed to cyclically vary the angle of attack (α) for individual airfoil blades 32. Specifically, this control will generate forces on the airfoil blades 32 in a manner that will control the speed and direction of flight of vehicle 20 in either the curtate or prolate modes. In the fixed wing mode, however, control is obtained by selectively introducing combinations of translational and rotational movements of the cluster of center gears 76.

Figure 9A:
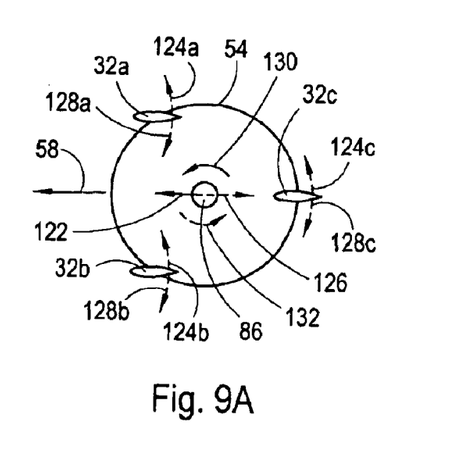
FIG. 9A is a representative view of airfoil angle of attack movements in response to translational movements of the center gear cluster.
Figure 9B:
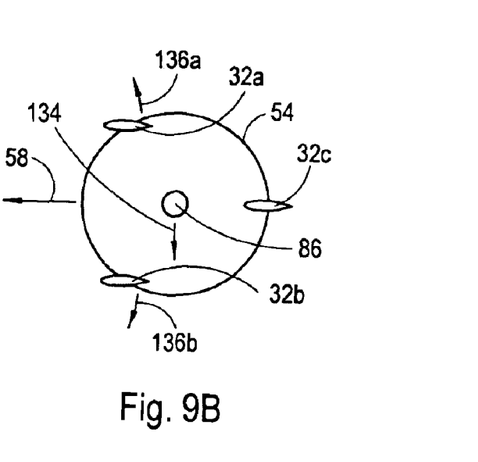
FIG. 9B is a representative view of airfoil angle of attack movements in response to a rotational movement of the center gear cluster.

For control over the vehicle 20 in the fixed wing flight mode, refer to FIG. 9A and FIG. 9B. Specifically, as indicated above, the vehicle 20 is propelled in the fixed wing flight mode by the shrouded propeller 28 on the empennage 24. Accordingly, rotation of the hub 30 is not required. Therefore, as the RPM of hub 30 falls below about 5 RPM, the drive shaft 64 is disengaged and the hub 30 is locked to the fuselage 22 by a latch (not shown). Preferably, when the hub 30 is locked for the fixed wing mode, the airfoil blades 32 will be arranged relative to the direction of flight (arrow 58), generally as shown in FIG. 9A. With this configuration, it is to be appreciated that a translational movement of the center gear axis 86 in directions substantially parallel to the chord lines 42a–c will move the airfoil blade 32c. Specifically, by moving the center gear axis 86 in the forward direction, indicated by arrow 122, the airfoil blade 32c will move in the direction of arrow 124c. On the other hand, an aft movement of the center gear axis 86 in the direction indicated by arrow 126 results in the movement of airfoil blade 32c in the direction of arrow 128c. It is also to be appreciated that pure rotational movements of the cluster of center gears 76 will result in movements of all of the airfoil blades 32a–c. Specifically, a rotation of the center gears 76 in the direction of arrow 130 will result in a movement of the airfoil blades 32a–c in the direction of arrows 124a–c, and a rotation of the center gears 76 in the direction of arrow 132 will result in a movement of the airfoil blades 32a–c in the direction of arrows 128a–c. As another possible control configuration for the airfoil blades 32a–c in the fixed wing mode, FIG. 9B indicates that a movement of the center gear axis 86 in the direction of arrow 134 will result in respective movements of the airfoil blades 32a and 32b in the directions of arrow 136a and 136b. Thus, the airfoils 32a and 32b can provide a braking action for the vehicle 20 that is opposite to its direction of travel (indicated by arrow 58).

Figure 10:
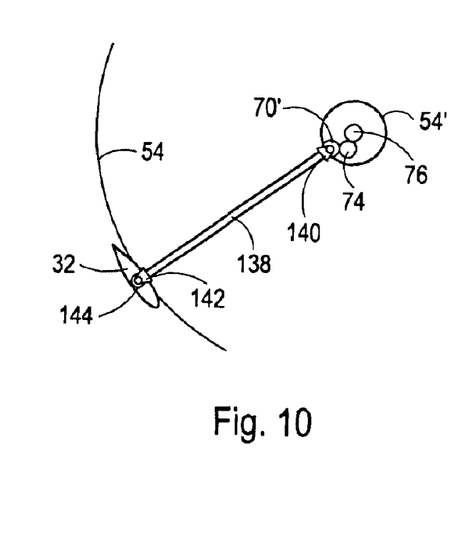
FIG. 10 is an alternate embodiment of a gear assembly in accordance with the present invention.
Figure 11:
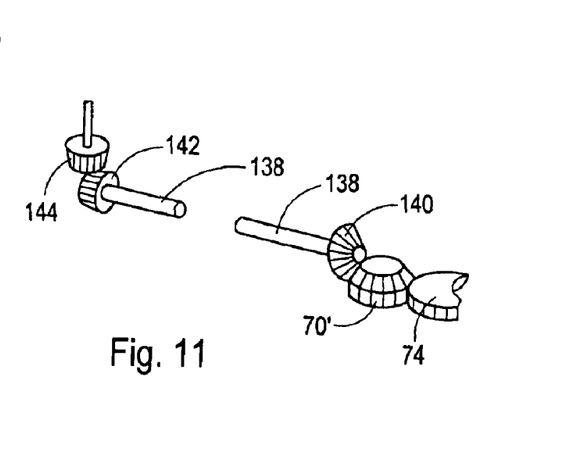
FIG. 11 is a perspective view of the linkage used for the alternate embodiment of the gear assembly shown in FIG. 10.

For an alternate embodiment of the gear assembly discussed above, reference is made to both FIG. 10 and FIG. 11. There it will be seen that the dimensions of the gear assembly (i.e. gears 70, 74 and 76) have been reduced. In this case the center gear 76 and mid-gear 74 are interconnected with a bevel blade gear 70' that travels on a modified blade path 54'. An extension arm 138 is provided with a bevel gear 140 at one end which interacts with the bevel blade gear 70'. At the other end of extension arm 138 there is another bevel gear 142 that interacts with a second bevel blade gear 144. The airfoil blade 32 is affixed to this second bevel blade gear 144 and, through the actions of bevel gears 140 and 142, the airfoil blade 32 is controlled by the center gears 76 substantially as disclosed above.

While the particular Cycloidal VTOL UAV as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for moving an aerial vehicle along a flight path, said system comprising:
   a substantially disk-shaped hub mounted on the vehicle for rotation about a hub axis, with said hub lying in a plane substantially perpendicular to the hub axis;
   an airfoil shaped blade positioned on said hub for rotation therewith, wherein said blade travels on a blade path around the hub axis during rotation of said hub, said blade defining a blade axis and a chord line;
   a gear assembly, said gear assembly including a blade gear, with said blade fixedly attached thereto, said blade gear being mounted on said hub for rotation around the blade axis and for rotation with said blade around the hub axis, a center gear oriented on said hub for rotation around a center gear axis with the center gear axis substantially parallel to the hub axis, and a mid-gear rotationally interconnecting said blade gear with said center gear, wherein said gear assembly is changeable between a first modality (curtate flight) wherein the chord line of said blade is maintained generally tangential to the blade path during rotation of said hub, and a second modality (prolate flight) wherein the chord line of said blade is maintained generally parallel to the flight path of the vehicle during rotation of said hub; and
   a means for moving the center gear to vary a distance between the center gear axis and the blade axis to rotate the chord line of said blade about said blade axis to alter the angle of attack of said blade and generate forces for moving the vehicle along the flight path.

2. A system as recited in claim 1 further comprising:
   a first link having a first end and a second end with the first end thereof pivotally mounted on said blade gear and the second end thereof pivotally mounted on said mid-gear; and
   a second link having a first end and a second end with the first end thereof pivotally mounted on said mid-gear and the second end thereof pivotally mounted on said center gear.

3. A system as recited in claim 2 wherein said center gear has a diameter and the center gear axis is moveable within a radial range from the hub axis between a location wherein the center gear axis is coaxial with the hub axis and a location wherein the center gear axis is approximately at a one half center gear diameter from the hub axis.

4. A system as recited in claim 1 wherein the blade axis is substantially perpendicular to the chord line, and wherein the blade axis is substantially parallel to the hub axis during rotation of said blade on the blade path around the hub axis.

5. A system as recited in claim 1 further comprising a means for selectively holding said center gear stationary relative to said hub axis to establish said gearing means in the second modality.

6. A system as recited in claim 1 further comprising a means for holding said hub stationary relative to the vehicle to change said gear assembly into a third modality (fixed wing flight).

7. A system as recited in claim 6 wherein said chord line rotating means comprises a means for rotating said center gear while said gear assembly is in the third modality.

8. A system as recited in claim 1 wherein said blade, said blade gear, and said mid-gear, in combination, comprise a blade orientation unit and said system comprises:
   a plurality of said blade orientation units; and
   plurality of center gears with each said center gear connected to a respective blade orientation unit.

9. A cycloidal propulsion and control system for moving an aerial vehicle along a flight path which comprises:
   a first hub and a second hub, said first and, second hubs being respectively mounted on the vehicle for rotation about a common hub axis;
   a first plurality of elongated airfoil blades defining respective chord lines and mounted on said first hub substantially parallel to the hub axis for rotation about the hub axis;

a second plurality of elongated airfoil blades defining respective chord lines and mounted on said second hub substantially parallel to the hub axis for rotation about the hub axis;

a gear assembly mounted on each said hub, wherein each gear assembly includes a blade gear, with a single said airfoil blade fixedly attached thereto, and wherein said airfoil blade defines a blade axis, said blade gear being mounted on said hub for rotation around the blade axis and for rotation with said blade around the hub axis, a center gear oriented on said hub for rotation around a center gear axis with the center gear axis substantially parallel to the hub axis, and a mid-gear rotationally interconnecting said blade gear with said center gear; and a means for moving the center gear of each gear assembly to vary a distance between the center gear axis and the blade axis to individually and selectively vary an orientation for each chord line of each said airfoil blade for propelling and controlling the vehicle while the vehicle is on the flight path.

10. A system as recited in claim 9 wherein each rotating airfoil blade travels on a blade path around the hub axis and wherein each gear assembly is changeable between a first modality (curtate flight) wherein the chord line of said blade is maintained generally tangential to the blade path during rotation of said hub, and a second modality (prolate flight) wherein the chord line of said blade is maintained generally parallel to the flight path of the vehicle during rotation of said hub.

11. A system as recited in claim 9 wherein three gear assemblies are mounted on each said hub.

12. A system as recited in claim 11 wherein each center gear has a respective start point for establishing a same orientation for the chord line of each airfoil blade at a predetermined point on the blade path.

13. A system as recited in claim 12 wherein said respective start points of said three center gears are mutually off-set from each other by an arc of 120° (curtate mode).

14. A system as recited in claim 12 wherein said respective start points of said three center gears are substantially aligned with each other (prolate mode).

15. A method for moving an aerial vehicle along a flight path which comprises the steps of:

mounting a first plurality of elongated airfoil blades on a first hub, wherein each airfoil blade defines a chord line and is mounted on said first hub substantially parallel to a hub axis of rotation;

mounting a second plurality of elongated airfoil blades on a second hub, wherein each airfoil blade defines a chord line and is mounted on said second hub substantially parallel to the hub axis of rotation;

selectively rotating the first and second plurality of airfoil blades about the hub axis;

individually and selectively varying an orientation for each chord line of each said airfoil blade for changing between a first modality (curtate flight) wherein the chord line of said blade is maintained generally tangential to the blade path during rotation of said hub, and a second modality (prolate flight) wherein the chord line of said blade is maintained generally parallel to the flight path of the vehicle during rotation of said hub; and holding said hub stationary relative to the vehicle to change said gear assembly into a third modality (fixed wing flight).

* * * * *